United States Patent Office 3,050,784
Patented Aug. 28, 1962

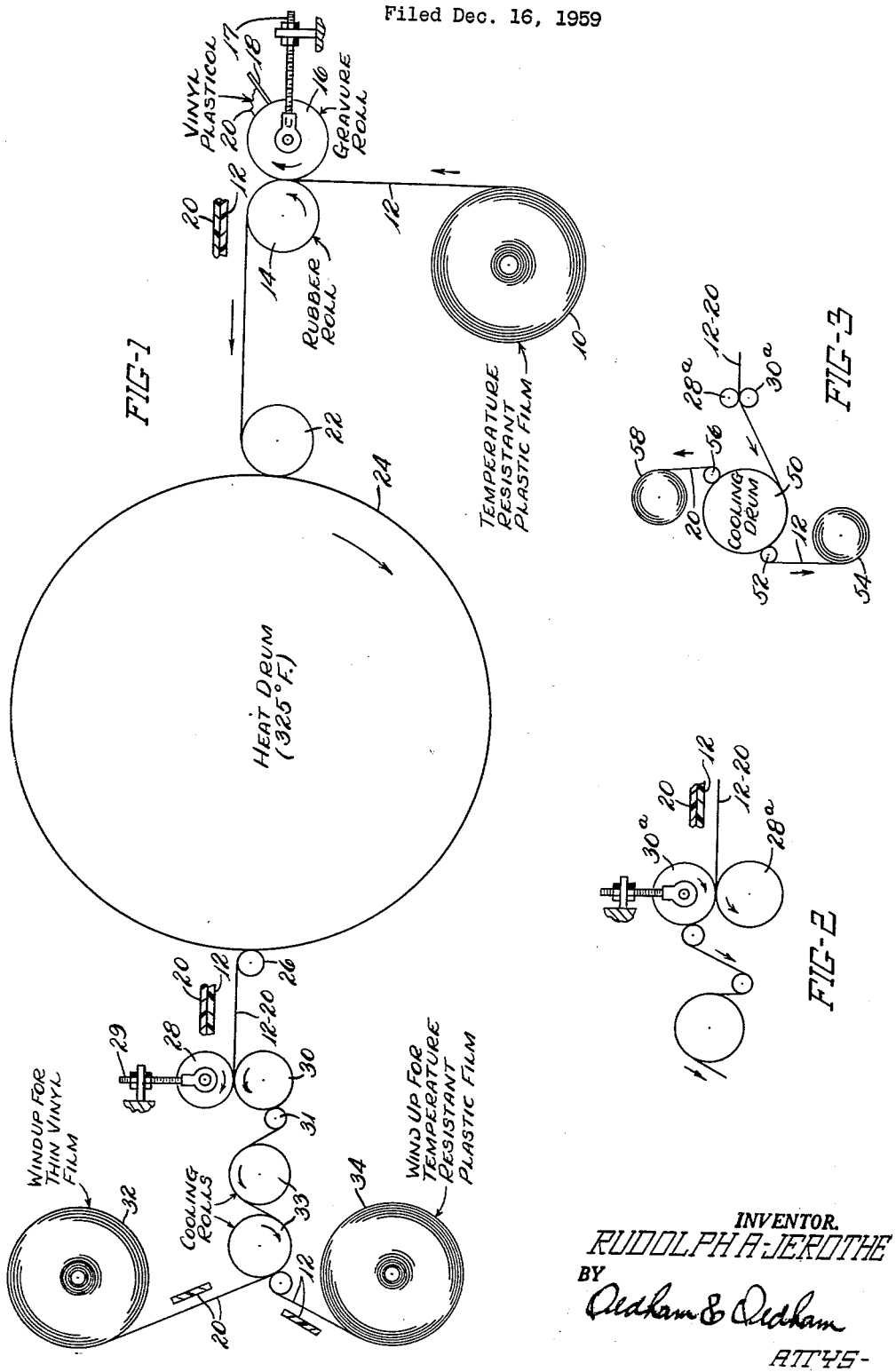

3,050,784
METHOD OF MAKING RELATIVELY THIN VINYL FILMS
Rudolph A. Jerothe, Pines Lake, Wayne, N.J., assignor to Toscony, Inc., Passaic, N.J., a corporation of New York
Filed Dec. 16, 1959, Ser. No. 859,937
2 Claims. (Cl. 18—57)

This invention relates to an improved method for making relatively thin vinyl films, and particularly for making vinyl films of less than about 1.5 mils thickness.

Various techniques and apparatus have been utilized heretofore for the manufacture of vinyl films. Usually these require relatively heavy and expensive calender or casting equipment so that the manufacture of vinyl films has been confined to relatively large companies with heavy capital equipment investments. However, even with equipment of this type the casting of relatively thin or the rolling of relatively thin vinyl films, for example of less than about 2 mils in thickness has resulted in films of non-uniform thickness from edge to edge of the film, and defects such as pin holes and surface imperfections.

It is the general object of the present invention to provide an improved process for rapidly and inexpensively manufacturing unsupported relatively thin vinyl films, for example of less than about 1.5 mils thickness, and down to .5 mil, of uniformly high grade quality and the same gauge from side to side of the film, the process being relatively quickly and easily performed with comparatively light and inexpensive apparatus capable of being installed in the plant of a user or a fabricator of vinyl films.

Another object of the invention is the provision of a method in which thin gauge vinyl films of high polish or other surface finish and excellent uniformity can be obtained with a minimum of operator control and attention.

The foregoing objects of the invention, and other objects which will become apparent as the description proceeds, are achieved by the provision of a method of making relatively thin vinyl films of less than about 1.5 mils thickness which include the steps of continuously passing a temperature resistant plastic film having a desired surface finish over an elongated path, continuously applying a vinyl plastisol to the surface of the plastic film to form a uniform surface coating of less than about 1.5 mils thickness over the plastic film, continuously heating the vinyl plastisol while applying pressure thereto to fuse the plastisol into a vinyl film, continuously cooling the laminated films, continuously separating the vinyl film from the plastic film, and continuously but separately winding up the vinyl film and the plastic film. The method preferably includes the continuous polishing of the vinyl film against the plastic film while still hot, and the separation of the vinyl film from the plastic film after cooling. Also, the vinyl plastisol is preferably applied to the surface of the plastic film as a series of dots normally in excess of 2,000 to the square inch and positioned sufficiently close together and with the plastisol sufficiently liquid that the dots run together before or during the application of heat and pressure to form the uniform surface coating of vinyl plastisol over the plastic film.

For a better understanding of the invention reference should be had to the accompanying drawings wherein
FIG. 1 is a diagrammatic side elevation of a typical apparatus utilized to perform the method of the invention;
FIG. 2 illustrates a preferred method of making a vinyl film having one side polished and the other side matte or embossed; and
FIG. 3 is a fragmentary view of a portion of the apparatus of FIG. 1 and illustrating another manner of cooling and separating the vinyl film from the temperature resistant plastic film.

In the drawings, the numeral 10 indicates a roll of temperature resistant plastic film or a carrier web 12. This film may be of the polyester type sold by E. I. du Pont de Nemours & Company of Wilmington, Delaware under the trademark "Mylar." The film 12 is not softened by the temperatures to which it is subjected in the method of the invention, but is stress relieved so as to lie laterally flat against the heat drum utilized in the method. In addition, the film 12 possesses a relatively high polish, is comparatively thin, being only several mils thick, but is tough and strong.

The film 12 is passed over a rubber roll 14 and in the continuous elongated path illustrated in FIG. 1. Cooperating with the roll 14 is a gravure roll 16 having in association therewith a blade 18 for supporting a pocket of vinyl plastisol 20 against the surface of the roll 16. Preferably only roll 14 is driven and roll 16 is adjustably mounted for movement toward and from roll 14 by means of nuts on screw 17.

The gravure roll 16 is more fully described in my co-pending patent application Serial No. 856,241, filed Nov. 30, 1959, now Patent Number 3,036,927, and entitled "Method of Coating Vinyl Film With a Surfacing Color." Suffice it to say here that the roll 16 is engraved over its entire surface with a relatively large number of pockets or cups, usually in excess of 2,000 per square inch, each cup being filled with vinyl plastisol as the roll turns in the direction of the arrow underneath the vinyl plastisol held by the blade 18, with the vinyl plastisol in the cups being transferred from the surface of the cups to the surface of the plastic film 12 by the adjustable pressure engagement of roll 16 against the film 12. This produces on the surface of the temperature resistant plastic film 12 a plurality of dots of vinyl plastisol, usually in excess of 2,000 per square inch, the dots being very close together, and with the vinyl plastisol of a consistency so that the dots coalesce or unite on the surface of the plastic film 12 to form a continuous highly uniform relatively thin layer of vinyl plastisol of less than about 1.5 mils thickness and as thin as .5 mil if desired on the surface of the plastic film 12 as the film passes in the direction of the arrow from the rubber roll 12. This coalescing of the dots of plastisol normally occurs during or immediately after deposit and is completed under the heat and pressure applied to the plastisol on the drum 24.

The plastic film 12 with the layer of vinyl plastisol 20 thereon is pressed by a roll 22 into pressure engagement with a heat drum 24 held, for example, at a temperature of 325° F., and with the drum turning in the direction of the arrow. The tension in the plastic film 12 holds the vinyl plastisol under pressure against the heat drum 24, and with the speed of rotation of the drum and the length of its heating surface being such that together with the selected temperature of the drum the vinyl plastisol 20 on the surface of the plastic film 12 is completely set up or fused by the time the laminate leaves the surface of the heat drum as it bends around a roller 26.

The laminate indicated by the numeral 12–20 passing over the roll 26 passes to and between driven polishing and tensioning rollers 28 and 30, roller 28 normally being of rubber and with the rolls rotating in the direction of the arrows so that a polishing action is obtained upon the still hot vinyl film 20. The pressure between rolls 28 and 30 is preferably made adjustable as by nuts on screw 29.

It should be noted here that the invention broadly teaches providing a matte finish on the carrier film 12 instead of a high polish so that the finished vinyl film 20 has a matte surface. However, it is preferable to provide a polished surface against the carrier film 12, as before described, and to provide a matte or embossed surface on the side of the vinyl film not in engagement with carrier film. This is achieved as shown in FIG. 2 wherein rubber roll 28a and metal roll 30a are interchanged and the metal roll 30a is formed with the desired matte or embossed design to be pressed into the hot formable surface of the vinyl film as it leaves the heat drum 24.

Leaving the polishing rolls 28 and 30 the vinyl film 20 passes under roll 31, around cooling rolls 33 and after cooling is stripped from the plastic film 12, with the vinyl film 20 being rolled up at 32 and the plastic film 12 being wound up at 34.

In the manner described it is possible to rapidly and uniformly make high quality relatively thin vinyl film, bearing a high polish, and of very excellent and uniform gauge. The method of the invention is adapted for use with relatively light and inexpensive equipment which can be made available in the plant of a user or fabricator of vinyl films as distinct from the heavy equipment normally required by the vinyl film manufacturer.

In the practice of the method of the invention it will be understood that the manner of applying the vinyl plastisol to the heat resistant plastic film is very important, and the gravure roll technique utilized has been proven to be satisfactory whereas attempts to apply the plastisol by means of a doctor bar or the like are completely unsatisfactory resulting in streaking and non-uniform gauge to such an extent that commercially salable unsupported film cannot be produced.

FIG. 3 illustrates another method for stripping the laminate 12—20 after it passes through pressure and polishing rolls 28a and 30a. More particularly, in this embodiment of the invention the laminate 12—20 as it passes from rolls 28a—30a extends over a cooling drum 50, with the temperature resistant film 12 being stripped from the vinyl film 20 while it is still held on the cooling drum by means of a roll 52 and a plastic film windup 54. The vinyl film 20 is passed over a roll 56 and to a windup 58 after it has passed over an additional periphery of the cooling drum 50.

While in accord with the patent statutes certain best known embodiments of the invention have been illustrated and described in detail, it is to be particularly understood that the invention is not to be limited thereto or thereby, but that its scope is defined in the appended claims.

What is claimed is:

1. That method of making unsupported relatively thin vinyl films of less than about 1.5 mils thickness which includes the steps of continuously passing a temperature resistant plastic film having a highly polished, smooth, and non-porous surface through an elongated path, continuously applying a plurality of dots of vinyl plastisol to the surface of the plastic film, said vinyl plastisol dots being normally in excess of two thousand to the square inch and positioned sufficiently close together and with the plastisol sufficiently liquid so that the dots run together and form a uniform surface coating of less than about 1.5 mils thickness over substantially the entire plastic film, applying pressure uniformly to the vinyl plastisol as it is led through a confined path of movement, continuously heating the vinyl plastisol while under pressure to complete the coalescing of the dots into a uniform film and to fuse the plastisol into a vinyl film, continuously cooling the laminated films, continuously separating the vinyl film when cooled from the plastic film, and continuously winding up the vinyl film.

2. That method of making unsupported relatively thin vinyl films of less than about 1.5 mils thickness which includes the steps of continuously passing a temperature resistant non-porous plastic film having a highly polished surface over an elongated path, continuously applying by printing with adjustably controllable pressure a plurality of spaced dots of vinyl plastisol to the surface of the plastic film, said vinyl plastisol dots being normally in excess of two thousand to the square inch, continuously carrying the printed film substantially horizontally and with the dots uppermost and with the plastisol sufficiently liquid so that the dots run together and form a uniform surface coating of less than about 1.5 mils thickness over substantially the entire plastic film, continuously heating the vinyl plastisol while applying pressure thereto to fuse the plastisol into a vinyl film and to complete the coalescing of the dots, continuously holding the vinyl film against the polished surface of the temperature resistant film with adjustably controllable pressure while the vinyl film is still hot, continuously molding an embossed surface on the side of the vinyl film not in contact with the plastic film, continuously cooling the laminated films, continuously separating the vinyl film when it has cooled from the plastic film, and continuously but separately winding up the vinyl film and the plastic film.

References Cited in the file of this patent

UNITED STATES PATENTS

| | | |
|---|---|---|
| 2,396,946 | Grup | Mar. 19, 1946 |
| 2,442,443 | Swallow | June 7, 1948 |
| 2,482,094 | Chavannes et al. | Sept. 20, 1949 |
| 2,500,728 | Williams | Mar. 14, 1950 |
| 2,566,982 | Clemens et al. | Sept. 4, 1951 |
| 2,654,913 | Maier | Oct. 13, 1953 |
| 2,741,215 | Cady et al. | Apr. 10, 1956 |
| 2,957,207 | Roop et al. | Oct. 25, 1960 |

FOREIGN PATENTS

| | | |
|---|---|---|
| 11,664/1910 | Great Britain | Oct. 20, 1910 |
| 482,836 | Great Britain | Apr. 5, 1938 |

OTHER REFERENCES

"It's Done With Plastisols," from Modern Plastics, December, pp. 87–93, 184, 186, 189, 191 and 193.